United States Patent
Hochstetler et al.

(10) Patent No.: US 10,599,165 B2
(45) Date of Patent: Mar. 24, 2020

(54) GOVERNOR AND INVERSION PUMP DRIVE GEAR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 323 days.

(21) Appl. No.: 15/813,300

(22) Filed: Nov. 15, 2017

(65) Prior Publication Data

US 2019/0146526 A1    May 16, 2019

(51) Int. Cl.
| | |
|---|---|
| *F16H 55/00* | (2006.01) |
| *G05D 13/30* | (2006.01) |
| *F02C 7/36* | (2006.01) |
| *F02C 7/32* | (2006.01) |
| *F16H 57/08* | (2006.01) |
| *F16H 3/42* | (2006.01) |
| *B64D 35/00* | (2006.01) |
| *F16H 55/17* | (2006.01) |

(Continued)

(52) U.S. Cl.
CPC ............ *G05D 13/30* (2013.01); *B64D 35/00* (2013.01); *F02C 7/32* (2013.01); *F02C 7/36* (2013.01); *F16H 3/426* (2013.01); *F16H 55/17* (2013.01); *F16H 57/082* (2013.01); *F02D 1/12* (2013.01); *F02D 2011/103* (2013.01); *F16H 2718/06* (2013.01)

(58) Field of Classification Search
CPC ......... F16H 55/0806; F16H 2055/0893; F16H 55/08
See application file for complete search history.

(56) References Cited

U.S. PATENT DOCUMENTS 4,640,149 A * 2/1987 Drago ................. F16H 55/0806
74/462
5,083,474 A * 1/1992 Rouverol ............ F16H 55/0806
74/461

(Continued)

FOREIGN PATENT DOCUMENTS

WO    02/099263 A1    12/2002

OTHER PUBLICATIONS

European Search Report for EP Application No. 18205497.3 dated Mar. 26, 2019.

*Primary Examiner* — Jake Cook
(74) *Attorney, Agent, or Firm* — Carlson, Gaskey & Olds, P.C.

(57) ABSTRACT

A governor and inversion pump drive gear for an integrated drive generator has a gear body extending from a first end to a second end. There is an enlarged disc between the first and second ends. A boss extends from the enlarged disc toward the second end and has an internal bore with spline teeth. The enlarged disc has input gear teeth at an outer periphery. A shaft portion extends from the disc to the first end. A flange is formed at a location intermediate the first end and the enlarged disc. The inner gear teeth and the drive gear teeth have unique tooth profiles. An integrated dive generator and a method are also disclosed.

20 Claims, 3 Drawing Sheets

(51) Int. Cl.
*F02D 11/10* (2006.01)
*F02D 1/12* (2006.01)

(56) References Cited

U.S. PATENT DOCUMENTS

| | | | | |
|---|---|---|---|---|
| 5,271,288 A | * | 12/1993 | Hayduk | B64C 27/12 74/462 |
| 5,341,699 A | * | 8/1994 | Rouverol | F16H 55/08 74/462 |
| 5,485,761 A | * | 1/1996 | Rouverol | F16H 55/08 29/893.3 |
| 2010/0283343 A1 | * | 11/2010 | Brust | F16H 55/0806 310/83 |
| 2010/0284835 A1 | * | 11/2010 | Allen | F04C 15/0061 417/410.1 |
| 2010/0327684 A1 | | 12/2010 | Grosskopf et al. | |
| 2015/0233460 A1 | * | 8/2015 | Brust | F16H 55/08 310/90 |

\* cited by examiner

GOVERNOR AND INVERSION PUMP DRIVE GEAR

BACKGROUND

This application relates to a governor and inversion pump drive gear for integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the output ring gear of the differential through an accessory drive gear. One such system is a governor, and one such pump is an inversion pump. A governor and inversion pump drive gear drives both from the accessory drive gear.

The governor and inversion pump drive gear must successfully provide rotational input to a governor and a pump. There are challenges with regard to this gear.

SUMMARY

A governor and inversion pump drive gear for an integrated drive generator has a gear body extending from a first end to a second end. There is an enlarged disc between the first and second ends. A boss extends from the enlarged disc toward the second end and has an internal bore with spline teeth. The enlarged disc has input gear teeth at an outer periphery. A smaller portion extends from the disc to the first end. A flange is formed at a location intermediate the first end and the enlarged disc. Drive gear teeth are formed at an outer periphery of the flange. The input gear teeth have a gear tooth profile defined by roll angles at points A, B, C, and D, with a roll angle at point A being between 20.9 and 22.3 degrees, a roll angle at point B being between 22.7 and 24.2 degrees, a roll angle at point C being between 28.2 and 29.7 degrees, and a roll angle at point D being between 30.0 and 31.5 degrees. The drive gear teeth have a gear tooth profile defined by roll angles at point A-D, with a roll angle of at point A of between 14.7 and 16.2 degrees, a roll angle at point B of between 18.7 and 20.2 degrees, a roll angle at point C of between 30.3 and 31.8 degrees, and a roll angle at point D of between 34.2 and 35.7 degrees.

In addition, an integrated drive generator is disclosed as is a method of replacing a governor drive gear in an integrated drive generator.

These and other features may be best understood from the following drawings and specification.

DETAILED DESCRIPTION

Figure 1:
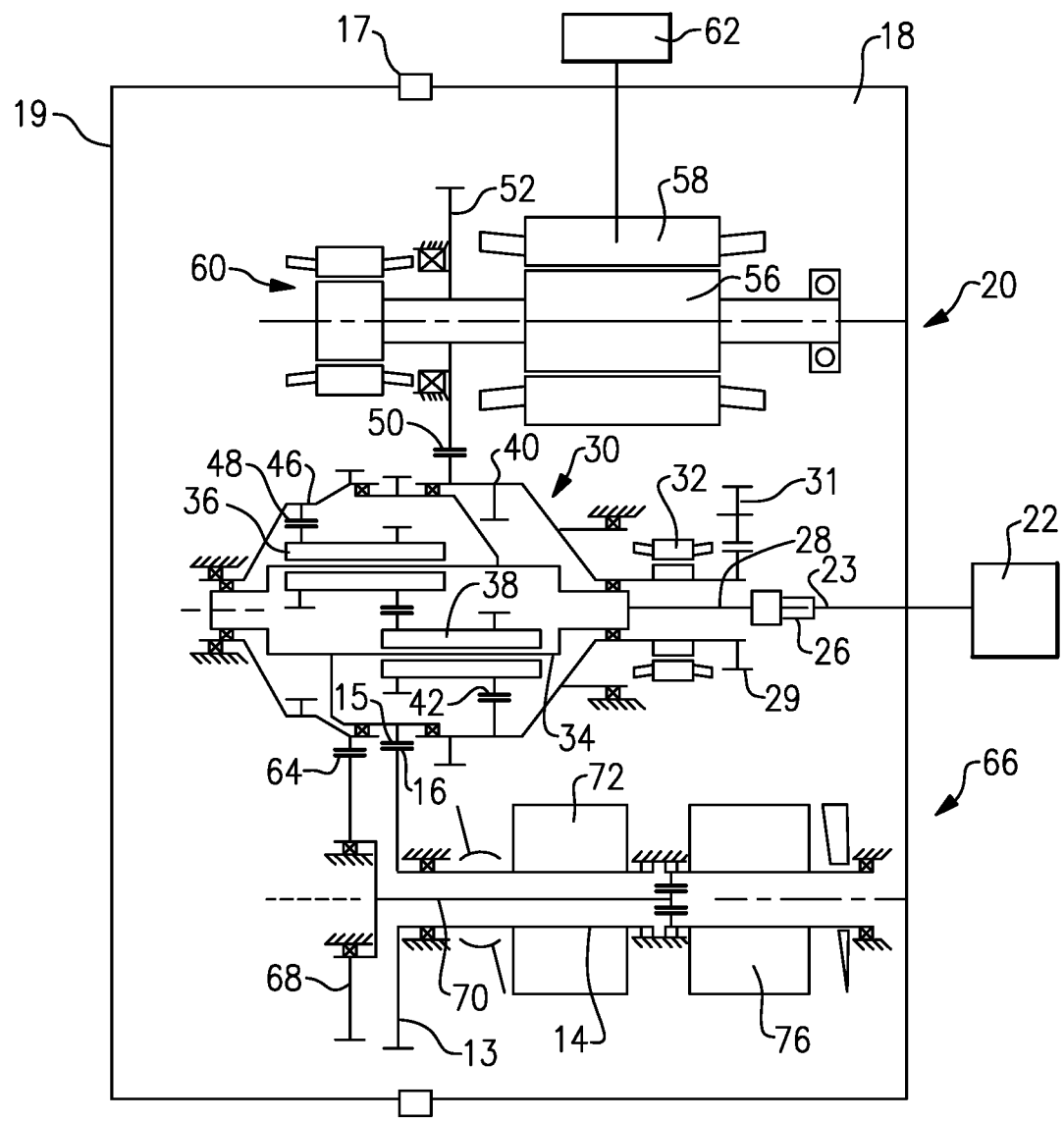
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the ring gear 40 and drives a plurality of accessory gears 31.

The operation of the integrated drive generator 20 is generally as known in the art. A worker of ordinary skill would recognize that the desired frequency and speed at use 62 would dictate a number of design functions.

Figure 2:
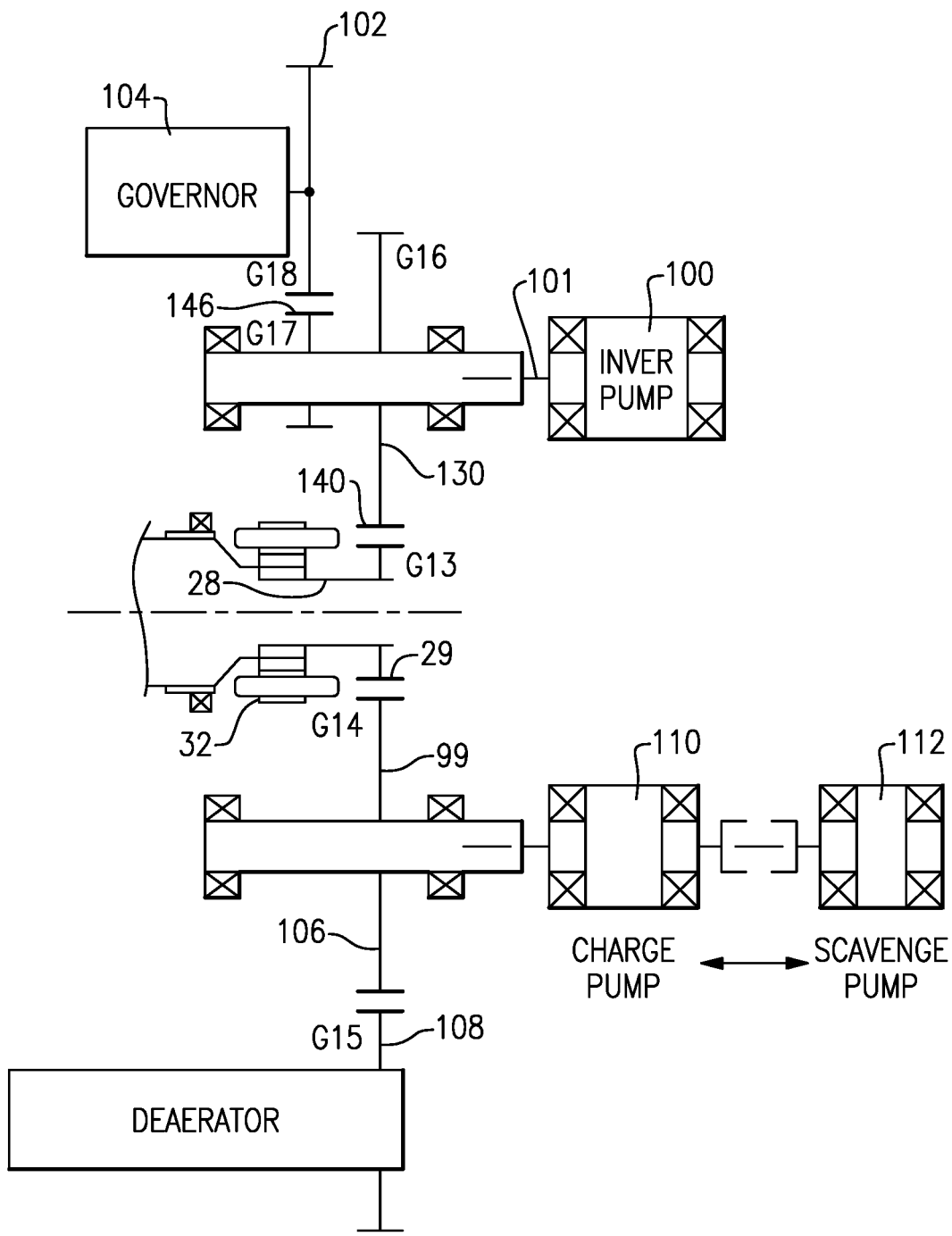
FIG. 2 shows an accessory drive system.

FIG. 2 shows the accessory drive gear 29. The accessory drive gear 29 drives driven gear 99 and a governor and inversion pump drive gear 130. These driven gears were shown schematically as gear 31 in FIG. 1. Gear 130 drives a governor 104 and an inversion pump 100. Also, the second gear 99 drives a deaerator through gear 108, as well as a charge pump 110 and a scavenge pump 112.

As shown, the governor and inversion pump drive gear (hereinafter "drive gear 130") has an outer input gear 140 that is driven by the accessory drive gear 29. A drive gear portion 146 in turn drives a gear 102 to drive the governor. A shaft 101 is driven by spline teeth on the drive gear 130 to drive the inversion pump 100.

Figure 3A:
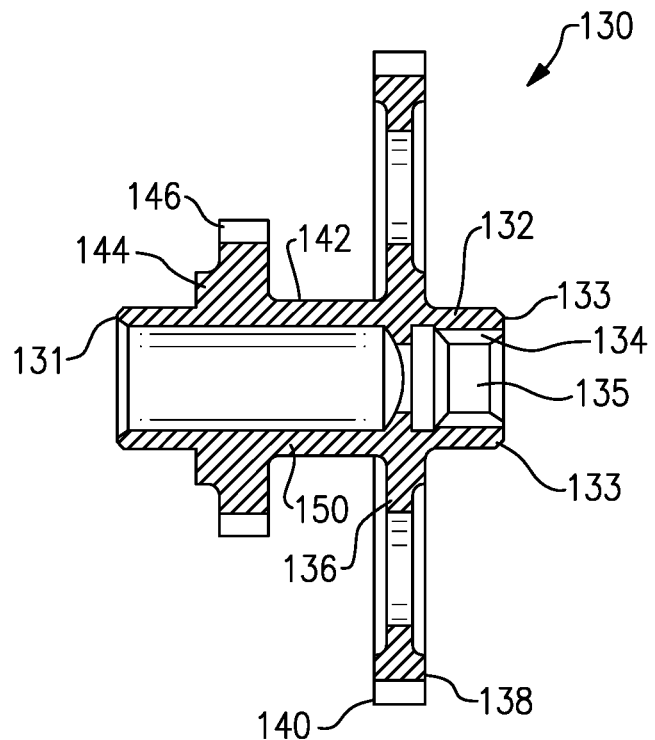
FIG. 3A is a first view of a governor and inversion pump drive gear.

FIG. 3A shows that drive gear 130 has a gear body 150 that extends from a rear or first end 131 to a forward or second end 133. A boss 132 is formed adjacent the forward end 133 and includes an internal bore 135 with eight spline teeth 134. Spline teeth 134 engage drive shaft 101 to drive inversion pump 100.

A forward, or enlarged, disc 136 extends to an outer diameter 138 and has a plurality of outer input gear teeth 140. A shaft portion 142 extends to a flange 144, which has outer drive gear teeth 146.

Figure 3B:
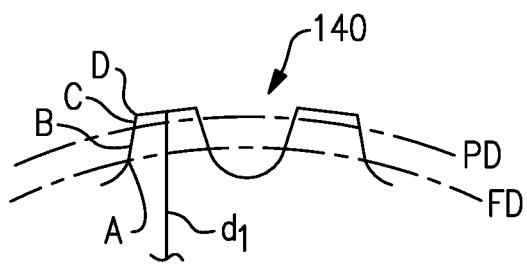
FIG. 3B shows a first gear tooth profile.

FIG. 3B shows a gear tooth profile for the gear teeth 140. Gear teeth 140 include 62 gear teeth. A pitch diameter PD is 3.10 inches (7.874 centimeters). This and all other dimensions are taken with a tolerance range of +/−0.010 inch (0.025 centimeters). A maximum form diameter FD is 3.00 inches (7.62 centimeters). The diameter to the outer diameter of the gear teeth 140 is 3.20 inches (8.128 centimeters). Gear teeth profiles are defined by roll angles at points A-D, as is known. Notably, the specific roll angles of this gear are not known, however, the nomenclature and technique for identifying the locations is known. Generally, the roll angle at A is at the maximum form diameter FD. The roll angle at B is 20 percent away from point A and toward point D. The roll angle at C is 80 percent away from point A and toward point D. The roll angle at D is at the outer diameter of the gear tooth.

The roll angle at A for the input gear teeth 140 is 21.6 degrees and in embodiments between 20.9 and 22.3 degrees. The roll angle at B is 23.4 degrees and in embodiments between 22.7 and 24.2 degrees. The roll angle at C for the outer gear teeth 140 is 29.0 degrees and in embodiments between 28.2 and 29.7 degrees. The roll angle at D is 30.8 degrees and in embodiments between 30.0 and 31.5 degrees. The diameter $d_2$ at the outer diameter of the gear teeth 140 is 3.20 inches (8.128 centimeters).

Figure 3C:
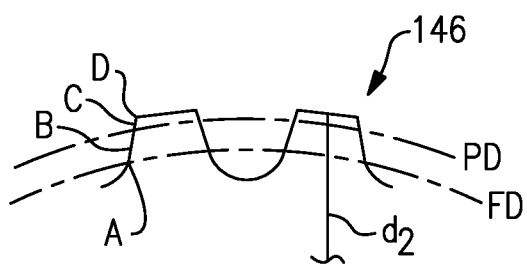
FIG. 3C shows a second gear tooth profile.

FIG. 3C shows the gear teeth profile for the drive gear teeth 146. There are 29 of teeth 146. The pitch diameter PD is 1.45 inches (3.683 centimeters). The maximum form diameter FD is 1.36 inches (3.454 centimeters). The diameter d to the outer diameter of the gear teeth 146 is 1.55 inches (3.937 centimeters).

The roll angle at A is 15.6 degrees and in embodiments between 14.7 and 16.2 degrees. The roll angle at B is 19.5 degrees and in embodiments between 18.7 and 20.2 degrees. The roll angle at C is 31.1 degrees and in embodiments between 30.3 and 31.8 degrees. The roll angle at D is 35.0 degrees and in embodiments between 34.2 and 35.7 degrees.

A method of replacing a governor and inversion pump drive gear includes the steps of removing an existing governor and inversion pump drive gear from an integrated drive generator. The integrated drive generator has an input shaft, a gear differential including a carrier shaft and a ring gear for driving a generator and accessory drive gear. The accessory drive gear is connected to drive a governor and inversion pump drive gear. The method further includes the step of replacing the existing governor and inversion pump drive gear with a replacement governor and inversion pump drive gear including a gear body extending between a first end and a second end and having a disc extending radially outwardly, and a boss extending from the disc toward the second end. Input gear teeth are formed outwardly of an outer diameter of the disc. The input gear teeth have a gear tooth profile with roll angles A, B, C, and D, and the input gear tooth profile having a roll angle at point A between 20.9 and 22.3 degrees, a roll angle at point B between 22.7 and 24.2 degrees, a roll angle at point C between 28.2 and 29.7 degrees, and a roll angle at point D between 30.0 and 31.5 degrees. Drive gear teeth are formed on a flange and have a gear tooth profile defined by roll angles at points A, B, C and D, with a drive gear tooth profile at point A having a roll angle of between 14.7 and 16.2 degrees, a roll angle at point B of between 18.7 and 20.2 degrees, a roll angle at point C of between 30.3 and 31.8 degrees, and a roll angle at point D of between 34.2 and 35.7 degrees.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A governor and inversion pump drive gear for an integrated drive generator comprising:
    a gear body extending from a first end to a second end, there being an enlarged disc between said first and second ends, and a boss extending from said enlarged disc toward said second end, and having an internal bore with spline teeth;
    said enlarged disc having input gear teeth at an outer periphery, and a shaft extending from said disc to said first end, with a flange formed at a location intermediate said first end and said enlarged disc, and drive gear teeth formed on an outer periphery of said flange, with said input gear teeth having a gear tooth profile defined by roll angles at points A, B, C, and D, with the input gear tooth profile having a roll angle at point A between 20.9 and 22.3 degrees, a roll angle at point B between 22.7 and 24.2 degrees, a roll angle at point C between 28.2 and 29.7 degrees, and a roll angle at point D between 30.0 and 31.5 degrees, and said drive gear teeth having a gear tooth profile defined by roll angles at points A, B, C and D, with a drive gear tooth profile at point A having a roll angle of between 14.7 and 16.2 degrees, a roll angle at point B of between 18.7 and 20.2 degrees, a roll angle at point C of between 30.3 and 31.8 degrees, and a roll angle at point D of between 34.2 and 35.7 degrees.

2. The governor and inversion pump drive gear as set forth in claim 1, wherein there are 62 of said input gear teeth and 29 of said drive gear teeth.

3. The governor and inversion pump drive gear as set forth in claim 2, wherein said input gear teeth have an outer diameter of 3.20 inches (8.128 centimeters)+/−0.01 inch (0.025 centimeters).

4. The governor and inversion pump drive gear as set forth in claim 3, wherein said input gear teeth have a pitch diameter of 3.10 inches (7.874 centimeters)+/−0.01 inch (0.025 centimeters).

5. The governor and inversion pump drive gear as set forth in claim 1, wherein said drive gear teeth have a pitch diameter of 1.45 inches (3.683 centimeters)+/−0.01 inch (0.025 centimeter).

6. The governor and inversion pump drive gear as set forth in claim 5, wherein said input gear teeth have an outer diameter of 3.20 inches (8.128 centimeters)+/−0.01 inch (0.025 centimeter).

7. The governor and inversion pump drive gear as set forth in claim 1, wherein said input gear teeth have an outer diameter of 3.20 inches (8.128 centimeters)+/−0.01 inch (0.025 centimeters).

8. An integrated drive generator comprising:
an input shaft, a gear differential including a carrier shaft being driven by said input shaft and including a ring gear connected for driving a generator;
said ring gear also connected to drive an accessory drive gear, said accessory drive gear connected to drive a governor and inversion pump drive gear; and
said governor and inversion pump drive gear including a gear body extending from a first end to a second end, there being an enlarged disc between said first and second ends, and a boss extending from said enlarged disc toward said second end, and having an internal bore with spline teeth receiving a shaft to drive an inversion pump;
said enlarged disc having input gear teeth at an outer periphery, said input gear teeth engaged with teeth on said accessory drive gear and a shaft portion extending from said disc to said first end, with a flange formed at a location intermediate said first end and said disc, and drive gear teeth formed on an outer periphery of said flange, with said input gear teeth having a gear tooth profile defined by roll angles at points A, B, C, and D, with the input gear tooth profile having a roll angle at point A between 20.9 and 22.3 degrees, a roll angle at point B between 22.7 and 24.2 degrees, a roll angle at point C between 28.2 and 29.7 degrees, and a roll angle at point D between 30.0 and 31.5 degrees, and said drive gear teeth having a gear tooth profile defined by roll angles at point A-D, with a drive gear tooth profile having a roll angle at point A of between 14.7 and 16.2 degrees, a roll angle point at B of between 18.7 and 20.2 degrees, a roll angle at point C of between 30.3 and 31.8 degrees, and a roll angle at point D of between 34.2 and 35.7 degrees.

9. The integrated drive generator as set forth in claim 8, wherein there are 62 of said input gear teeth and 29 of said drive gear teeth.

10. The integrated drive generator as set forth in claim 9, wherein said input gear teeth have an outer diameter of 3.20 inches (8.128 centimeters)+/−0.01 inch (0.025 centimeter).

11. The integrated drive generator as set forth in claim 10, wherein said input gear teeth have a pitch diameter of 3.10 inches (7.874 centimeters)+/−0.01 inch (0.025 centimeter).

12. The integrated drive generator as set forth in claim 8, wherein said drive gear teeth have a pitch diameter of 1.45 inches (3.683 centimeters)+/−0.01 inch (0.025 centimeter).

13. The integrated drive generator as set forth in claim 12, wherein said input gear teeth have an outer diameter of 3.20 inches (8.128 centimeters)+/−0.01 inch (0.025 centimeter).

14. The integrated drive generator as set forth in claim 8, wherein said input gear teeth have an outer diameter of 3.20 inches (8.128 centimeters)+/−0.01 inch (0.025 centimeters).

15. A method of replacing a governor and inversion pump drive gear comprising the steps of:
removing an existing governor and inversion pump drive gear from an integrated drive generator having an input shaft, a gear differential including a carrier shaft and the gear differential including a ring gear for driving a generator, said ring gear also connected for driving an accessory drive gear, said accessory drive gear connected to drive the existing governor and inversion pump drive gear; and
replacing the existing governor and inversion pump drive gear with a replacement governor and inversion pump drive gear including a gear body extending between a first end and a second end and having a disc extending radially outwardly, and a boss extending from said disc toward said second end, and having splines in an internal bore, and a shat extending from said disc toward said second end, a flange on said shaft, and drive gear teeth formed on said flange, there being input gear teeth outwardly of an outer diameter of said disc, said input gear teeth having a gear tooth profile with roll angles A, B, C, and D, and the input gear profile having a roll angle at point A between 20.9 and 22.3 degrees, a roll angle at point B between 22.7 and 24.2 degrees, a roll angle at point C being between 28.2 and 29.7 degrees, and a roll angle at point D being between 30.0 and 31.5 degrees, and said drive gear teeth having a gear tooth profile defined by roll angles at points A, B, C and D, with a drive gear tooth profile at point A having a roll angle of between 14.7 and 16.2 degrees, a roll angle at point B of between 18.7 and 20.2 degrees, a roll angle at point C of between 30.3 and 31.8 degrees, and a roll angle at point D of between 34.2 and 35.7 degrees.

16. The method of replacing a scavenge pump drive gear as set forth in claim 15, wherein there are 62 of said input gear teeth.

17. The method of replacing a scavenge pump drive gear as set forth in claim 16, wherein said input gear teeth have a pitch diameter of 1.45 inches (3.683 centimeters)+/−0.01 inch (0.025 centimeter).

18. The method as set forth in claim 17, wherein said input gear teeth have an outer diameter of 3.20 inches (8.128 centimeters)+/−0.01 inch (0.025 centimeter).

19. The method as set forth in claim 15, wherein said input gear teeth have an outer diameter of 3.20 inches (8.128 centimeters)+/−0.01 inch (0.025 centimeter).

20. The method of replacing a scavenge pump drive gear as set forth in claim 15, wherein said outer gear teeth have a pitch diameter of 1.45 inches (3.683 centimeters)+/−0.01 inch (0.025 centimeter).

* * * * *